United States Patent [19]

Swearingen

[11] 4,217,463
[45] Aug. 12, 1980

[54] FAST RESPONSIVE, HIGH PRESSURE THERMOCOUPLE

[75] Inventor: Saxon B. Swearingen, La Porte, Tex.

[73] Assignee: National Distillers and Chemical Corporation, New York, N.Y.

[21] Appl. No.: 886,232

[22] Filed: Mar. 13, 1978

[51] Int. Cl.² .............................................. H01L 35/02
[52] U.S. Cl. ..................................... 136/232; 73/341; 73/359 R; 136/230; 136/242
[58] Field of Search ............. 73/341, 359 R; 136/230, 136/232, 242

[56] References Cited

U.S. PATENT DOCUMENTS 3,376,169  4/1968  Davis et al. .......................... 136/230

FOREIGN PATENT DOCUMENTS 814503  6/1959  United Kingdom .................... 136/230

Primary Examiner—Leland A. Sebastian
Attorney, Agent, or Firm—Kenneth D. Tremain

[57] ABSTRACT

A duplex thermocouple assembly for operation in a high pressure environment and to have a rapid response time. The assembly consists of two small diameter thermocouples and a fitting designed to protectively hold the thermocouples. The thermocouples are soldered into two axial channels which extend along the length of a stainless steel cylinder which forms a portion of the protective fitting. At the temperature sensing end of the assembly the ends of the thermocouples project slightly beyond one end of the cylinder. The cylinder is soldered at its other end into a hole axially drilled in one end of a larger stainless steel cylinder so that both cylinders form a protective fitting for the thermocouples.

6 Claims, 6 Drawing Figures

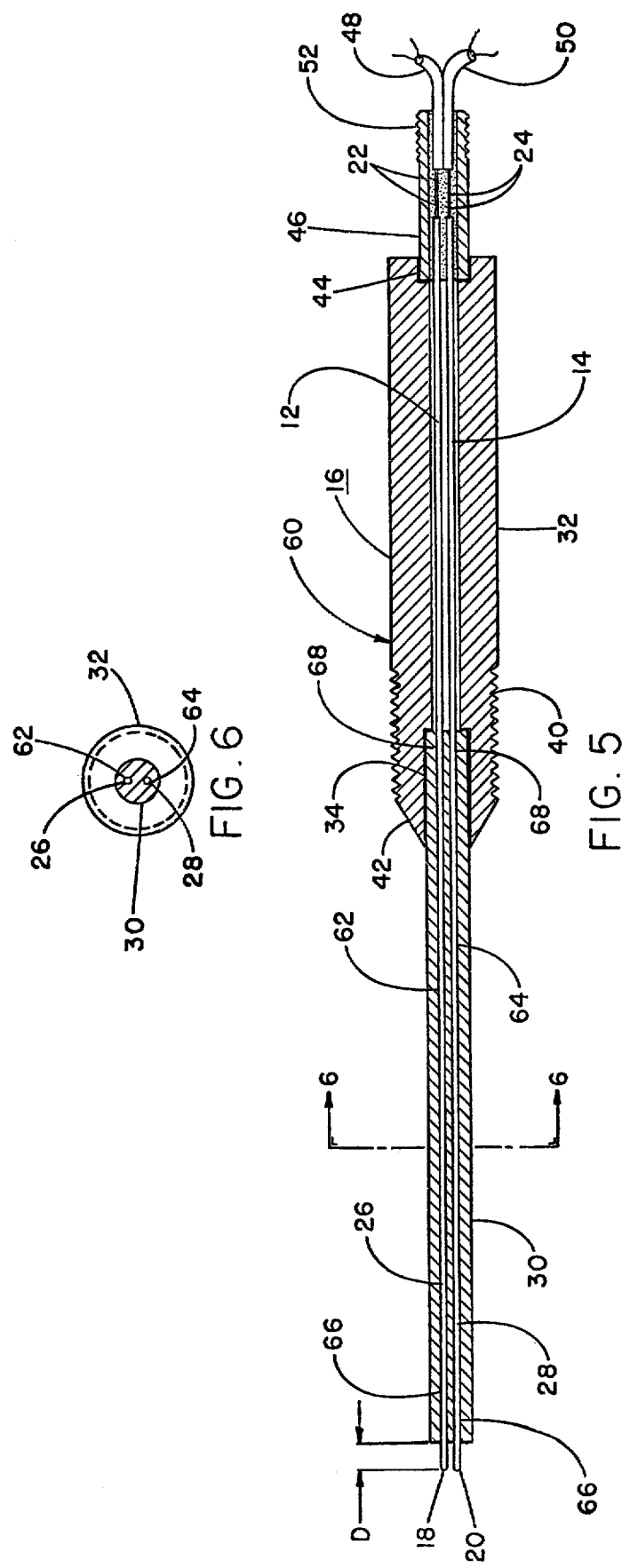

FAST RESPONSIVE, HIGH PRESSURE THERMOCOUPLE

BACKGROUND OF THE INVENTION

1. Field of the Invention

The present invention relates, in general, to the technology of temperature measurement and, more particularly, to temperature measurement through the use of a thermocouple. In further detail, the present invention relates to a thermocouple assembly which is designed to protectively retain a thermocouple in a high pressure environment in a manner so as not to impair the response time of the thermocouple.

2. Discussion of the Prior Art

In the manufacture of polyethylene, the accurate control of the temperature present within a reactor is essential in order to ensure the production of high quality polyethylene product. Early polyethylene reactors generally utilized a thermocouple installed in a thermowell wherein a heat conductive material, such as an oil or silicone, was placed in the thermowell to ensure a good thermal connection or high degree of heat transfer between the well and the thermocouple. Subsequent to the use of this arrangement for several years, a thermocouple was designed which would satisfactorily withstand the great pressures reigning within the polyethylene reactor and, accordingly, would be capable of being directly immersed in the reactant materials being processed in the reactor without necessitating the use of a protective thermowell. While the use of a thermocouple which could be directly installed in the reactor process medium represented an improvement over the previous type of thermocouple installed in a thermowell, the thermocouples which were utilized could not detect temperature changes rapidly enough to enable the taking of measures which would prevent deleterious runaway reactions from being generated within the reactor or to result in the production of materials not meeting their manufacturing specifications.

The response time of these prior art thermocouples fairly well matched the response time of the control equipment for the polyethylene reactor which was available in the technology at that time. However, in recent years control equipment has been developed which has much faster response times. In view of the rapid response time of present control equipment, the sometime slower response time of the thermocouple has become a limiting factor in the speed of response for the overall reactor control system.

Generally, the response time of a thermocouple is defined as the elapsed time which is required for the thermocouple junction to reach 63.2% of its final temperature when exposed to, successively, two different temperature levels. The response time is typically influenced by several factors, including, the type and size of wire utilized to form the elements of the thermocouple junction, the size of the thermocouple junction weld, and the heat sink effect of protective sheaths utilized to hold and encompass the thermocouple. Heretofore, it has been the practice in the art to install thermocouples within a relatively heavy stainless steel sheath in order to ensure that the thermocouple assembly has adequate mechanical strength for use in polyethylene reactors. The protective sheath acts as a heat sink, and, accordingly, becomes a very significant factor in degrading the thermocouple response time.

Thus, it becomes desirable to provide a thermocouple assembly which is designed to operate in a high pressure environment of up to 60,000 psi, such as in a polyethylene reactor, which will operate in a high temperature environment of up to 600° F., has adequate mechanical strength allowing it to be utilized in the reactor, and also has a rapid response time, in a magnitude of less than 0.2 seconds, so as to enable it to quickly sense any changes of temperature taking place within the reactor.

Maurer U.S. Pat. No. 3,811,958 discloses a thermocouple assembly in which the sensing thermocouple junction is encased in a metallic cylindrical sheath casing which is joined to a larger cylindrical casing. Maurer is not at all concerned with operation in a high pressure environment, and the joinder of the two cylindrical sections of the thermocouple would not provide an adequate pressure seal for a high pressure environment. Further, this patent does not disclose a duplex thermocouple assembly, but instead has structure providing for only one thermocouple junction.

Sabovik U.S. Pat. No. 3,589,192 discloses a thermocouple assembly in which an elongated sheathed thermocouple is received in a bore in a mounting body member. The sheathed thermocouple is releasably held in the mounting body so as to be movable or displaceable axially relative to the body member, and thereby provide an adjustment whereby the thermocouple junction may project varying distances from the end of the body member. The presence seal in this thermocouple assembly is formed by a compressible gasket arranged between the two movable members and which would afford inadequate sealing in a high pressure environment.

Pustell U.S. Pat. No. 3,539,400 illustrates a thermocouple assembly which is formed of two concentric cylindrical material sheaths in which the outer cylindrical sheath completely encloses the inner cylindrical sheath. The construction of this thermocouple assembly is designed to equalize thermal expansion between the various sheaths of the assembly. Pustell is not at all concerned with adequate sealing of the thermocouple assembly against the adverse effects of operation in a high pressure environment.

McCall U.S. Pat. No. 3,284,247 shows a thermocouple assembly wherein the thermocouple wires are placed in a pair of axial channels which are formed in the thermocouple surface and extend along the axial length of one element of the assembly. However, the thermocouple wires are merely placed within these channels for purposes of guidance, and the thermocouple assembly disclosed in McCall is not designed to withstand inordinately high operating pressures.

Klicks U.S. Pat. No. 3,996,071 discloses a thermocouple assembly designed to measure temperature in extremely high pressure environments, but is not concerned with whether the response time of the thermocouple is impaired by the protective assembly. Accordingly, the design of the Klicks thermocouple assembly is of a completely different nature than that of the design of the present invention.

SUMMARY OF THE INVENTION

Accordingly, in order to overcome or ameliorate the limitations and drawbacks encountered in the prior art, the present invention contemplates the provision of an improved thermocouple assembly which is designed to operate in a high temperature and pressure environment, and wherein the assembly also is designed to rapidly respond to changes in temperature.

Pursuant to a preferred embodiment of the invention, there is disclosed a thermocouple assembly having at least one thermocouple which is at least partially positioned within an axial channel extending along the length of a fitting member. The temperature sensing end of the thermocouple projects slightly beyond one end of the fitting member so as to allow it to respond quickly to changes in temperature without being unduly encumbered by the slower temperature change of the fitting member. The other end of the first fitting member is positioned within an axial bore formed in one end of a second fitting member, the last-mentioned end of the first fitting member being sealingly joined within the bore to the second fitting member so as to form a high pressure resistant seal for the assembly.

Furthermore, in the disclosed embodiment, the first and second fitting members are substantially cylindrical in shape, and are preferably formed of stainless steel, with the fitting members being soldered together along their mutual contact surfaces where the end of the first fitting member extends into the axial bore formed in the second fitting member. Moreover, in the disclosed embodiment of the invention, the thermocouple is soldered into the axial channel in proximity to where the first and second cylindrical members are soldered together, and also at the end of the first fitting member from which the thermocouple extends into the temperature sensing region.

Further, in accordance with a first disclosed embodiment of the invention, the axial channel is formed in the surface of the first fitting member, whereas in a second embodiment of the invention, the axial channel is formed as an aperture which extends interiorly through the axial length of the first fitting member. Additionally, in the preferred embodiment of the invention, the thermocouple assembly is a duplex assembly having two separate thermocouples which are positioned in two axial channels formed in the first fitting member.

Accordingly, it is an object of the present invention to provide a thermocouple assembly incorporating a thermocouple adapted to operate at rapid response times in response to changes in temperature.

Another object of the present invention lies in the provision of a thermocouple assembly of the type described in which a fitting is provided for the thermocouple which will enable the latter to be used in a high pressure environment.

A more specific object of the present invention is to provide a thermocouple assembly for use in a polyethylene reactor which has a rapid response time to changes in temperature within the reactor, and which is adapted to withstand the high pressures and temperatures encountered within such a reactor.

BRIEF DESCRIPTION OF THE DRAWINGS

The foregoing and other objects and advantages of the novel thermocouple assembly constructed pursuant to the teachings of this invention may be readily understood by one skilled in the art, having reference to the following detailed description of preferred embodiments thereof, and taken in conjunction with the accompanying drawings, in which:

FIG. 5 is a longitudinal sectional view of a second embodiment of the thermocouple assembly pursuant to the invention; and FIG. 6 is a sectional view taken along line 6—6 in FIG. 5.

DETAILED DESCRIPTION

Figure 4:
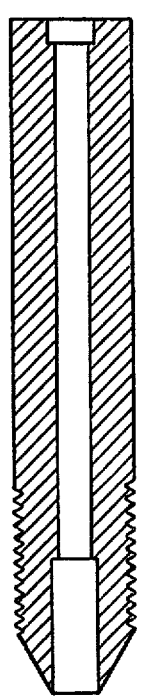
FIG. 4 is a longitudinal sectional view of one component of the thermocouple assembly of FIG. 1.
Figure 1:
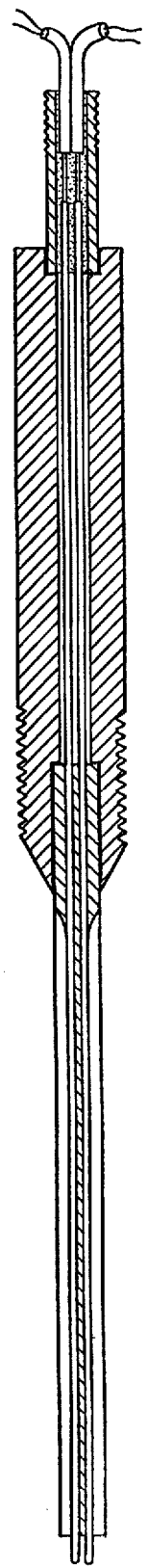
FIG. 1 is a longitudinal sectional view of one embodiment of a thermocouple assembly constructed pursuant to the present invention.

Referring now in detail to the embodiment of FIGS. 1 to 4 of the drawings, in FIG. 1 there is illustrated a longitudinal sectional view of a thermocouple assembly 10 which includes first and second thermocouples 12 and 14 mounted in a protective fitting 16. The thermocouples include temperature sensing ends 18 and 20 in which there are located the thermocouple junctions. The thermocouple junctions, and the pairs of wires 22, 24 which conduct the output signals of the thermocouples, the latter of which are protectively housed in cylindrically shaped sheaths 26 and 28 which extend along substantially the entire length of the fitting 16. The thermocouples 12 and 14 may be commercially available equipment, obtainable from Omega Engineering Company, Inc., Stamford, Conn. Preferably, thermocouples use 0.001 inch diameter wire to form the thermocouple junction, which is enclosed within a 0.02 inch diameter sheath formed of Inconel. The Inconel sheath enables the thermocouple to sense extremely high temperatures without being damaged. This physical aspect is important since the temperatures to which the thermocouples are subjected in a polyethylene reactor, particularly during severe decomps in the reactor, are extremely high.

The advantage of using relatively small sized thermocouples lies in the fact that they have relatively small thermal inertias whereby they are adapted to respond rapidly to changes in temperature within the reactor. In modifications of the invention, it is possible to employ other sizes and types of thermocouples. The fitting 16 which protectively houses the thermocouples consists of a first elongate cylindrical section 30 and a second larger diameter cylindrical section 32. One end of the smaller diameter section 30 extends into a circular bore 34 in the cylindrical section 32 (FIG. 4) along the central longitudinal axis at one end thereof. The end of the cylindrical section 30 extends into the bore 34 into contact with a shoulder 36 formed by a transverse end wall where the bore 34 joins a coextensive and coaxial smaller diameter bore 38 which continues through substantially the remainder of the length of the cylindrical section 32. The fitting sections 30 and 32 are silver soldered at their juncture surfaces so as to provide a high pressure seal for the thermocouple assembly.

The cylindrical section 32 includes an externally threaded portion 40 which allows the thermocouple assembly to be securely mounted in a corresponding internally threaded aperture in the reactor. The section 32 further includes a tapered portion 42 at the end thereof where it is joined to the small diameter section 30. The taper 42 may be adapted to facilitate sealing of the assembly against a corresponding mating surface in the reactor (not shown) when the assembly is screwed into place in the reactor. A larger diameter bore 44 formed in the opposite end of the section 32 accommodates one end of a fitting 46 which may be pressed therein and soldered into place, and which houses the connections of the pairs of the output wires 22 and 24 to further leads 48 and 50 which couple the output signals of the thermocouples to appropriate control equipment (not shown) for the reactor. The fitting 46 is provided with an external thread 52 at its projecting end to receive a matingly internally threaded second position of the fitting (not shown). In a preferred aspect of the invention, the cylindrical sections 30 and 32 may be constructed of high grade stainless steel, although other suitable materials may also be employed. When mounted on the reactor, as illustrated in the drawings, the cylindrical section to the left of threaded portion 40 is positioned in the reactor, whereas the larger diameter cylindrical section to the right of threaded portion 40 extends outside of the reactor. The assembly is designed to withstand pressure differentials between the interior and exterior of the reactor of up to about 60,000 psi.

Figure 3:
FIG. 3 is a sectional view taken along line 3—3 in FIG. 1.
Figure 2:
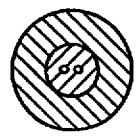
FIG. 2 is a sectional view taken along line 2—2 in FIG. 1.

The cylindrical section 30 of the fitting has two longitudinally extending, diametrically opposite open channels 54 formed along its outer cylindrical surface. The channels 54 may be milled into the surface of the section 30. The open channels 54 extend from the temperature sensing end of section 30 along a major portion of the length of the section 30 but terminate prior to where the other end of the section 30 enters bore 34. Axially extending holes 56 are drilled into the other end of the section 30 forming closed channels which communicate in coaxial relationship with the bottom portions of the open channels 54. The holes are of a slightly larger diameter than the thermocouple sheaths and, for example, when the sheaths each have an 0.02 inch external diameter, the holes may each have an 0.025 inch diameter. The thermocouples are positioned in the channels 54 and 56, as shown in FIGS. 1, 2 and 3, and are then silver soldered in the closed channels 56 to provide high pressure seals for the assembly. The thermocouples are also silver soldered into the open channels 54 at tip 58 proximate the temperature sensing end of the assembly, by merely placing a few drops of solder into the channels at 58. The thermocouples 12 and 14 are thus secured within the channels in the cylinder section 30 at both ends of the latter, but are freely supported within the channels 54 over most of their length along the section 30. This freely supported placement allows the thermocouples to be slightly bowed lengthwise so as to compensate for any differences in the extent of thermal expansion between the fitting and the thermocouples.

The temperature sensing ends of the thermocouples 26 and 28 at which the thermocouple junctions are located, project an axial distance D beyond the end of the section 30. The projected distance D allows the thermocouples to quickly respond to changes in temperature taking place within the reactor since the projecting ends of the thermocouples are relatively free from the high thermal inertia of the larger physical mass of the fitting. In one embodiment, this projecting distance D was selected to be 3/64 inch. The projecting distance D for the thermocouple ends is a compromise between a large distance which provides for a high speed of response for the thermocouples and a small distance which affords maximum protection to the thermocouples. Depending upon the desired application of the thermocouple assembly and response time required, the distance D may be selectively chosen larger or smaller.

The embodiment of the inventive thermocouple assembly described thus far is constructed employing the following assembly technique:

The fitting sections are cleaned with a suitable solvent, and the surfaces of the thermocouples which are to be soldered together are cleaned with a fine sandpaper. Flux is applied to the areas of the thermocouples to be soldered together, and the thermocouples are inserted into and through the axial channels in the cylindrical section 30. The thermocouples 26, 28 are then moved back and forth to ensure that flux is thoroughly worked into the closed portions 56 of the axial channels 54, 56. Flux is then applied to the temperature sensing end 58 of the section 30 where the thermocouples are to be soldered. The distance of axial projection D of the temperature sensing ends of the thermocouples beyond the end of the section 30 is then adjusted. The portions of the thermocouples 26, 28 adjacent the temperature sensing end 58 of the assembly are then silver soldered into the channels 54. The thermocouples are then curved or slightly bowed into the channels 54 to allow for a difference in thermal expansion between the thermocouples and the smaller diameter fitting section 30. The cylindrical section 30 is then placed in a vertical position and the section of the fitting surrounding the closed channels 56 is heated to evaporate moisture from the flux in the closed channels. Flux and a small mound of silver solder are then applied around the thermocouple sheaths at the top of the entrance to the closed channels. The section 30 is then heated about the portion having closed channels 56 until solder flows completely through the closed channels and appears at the lower ends thereof. The end of the smaller cylinder fitting 30 which is to be inserted into the axial bore 34 in the larger section 32 is then cleaned with a fine sandpaper and all flux and silver solder are removed from that end. Flux is applied to the areas or surfaces which are to be joined, and the end of the section 30 is inserted into the bore 34 in the larger section 32 until it contacts surface 36. The assembly is then mounted in a vertical position with the section 30 being on top, and the large cylindrical fitting 32 is heated around the area which is to be soldered so as to evaporate any moisture in the flux. Flux and a mound of silver solder are applied to the top of the larger diameter section 32 around the area to be joined. The outside of the large cylindrical fitting 32 is then heated around the area to be soldered until solder flows into the area between the two assembled sections 30 and 32. The assembly is then cooled, and the tapered end 42 of the large cylindrical section is machined to the proper conical configuration.

FIGS. 5 and 6 illustrate a second embodiment of a thermocouple assembly 60, similar to that already described and in which similar or like parts are designated by the same reference numerals as in FIGS. 1 through 4, however, wherein the channels 62 and 64 formed in the cylindrical section 30 of the fitting are completely closed along the entire length of that section rather than being open as channels 54 in the previously described embodiment. In this embodiment of the invention, the channels may be formed by simply drilling two axial holes along the length of the section 30. The holes should be sufficiently large to allow for any difference in thermal expansion taking place between the thermocouples 26, 28 and the fitting 30, and yet should still allow for a satisfactory soldering of the end portions 66 and 68 of the thermocouples into the ends of the cylindrical fitting 30.

While several embodiments of the novel thermocouple assembly constructed pursuant to the present invention have been described, the teachings of the present invention will suggest many other alternative embodiments to those skilled in the art.

What is claimed is:

1. A thermocouple assembly for operation in a high pressure environment and providing for a rapid response time to sensed changes in temperature, comprising:

(a) at least one thermocouple having a rapid response time to sensed changes in temperature;
   (b) a first protective fitting member having a substantially cylindrical configuration and at least one axial channel extending along the length of the fitting member, said thermocouple being protected by being at least partially positioned within said axial channel, said thermocouple having a temperature sensing end projecting slightly beyond one end of said first fitting member for facilitating it to sense the temperature in the region proximate thereto without being unduly influenced by the temperature of said first fitting member;
   (c) a second protective fitting member having a substantially cylindrical configuration and an axial bore formed therein, the distal end of said first fitting member being postioned in said bore, said thermocouple extending through said bore;
   (d) and means for sealingly joining said distal end of said first fitting member to said second fitting member within said bore to form a high pressure seal between the first and second fitting members, comprising means for soldering the distal end of said first fitting member within said bore in the second fitting member; and
   (e) said thermocouple being soldered into said axial channel in proximity to the soldered juncture of said first and second fitting members, said thermocouple being soldered into the axial channel proximate said temperature sensing end of said first fitting member, a portion of the thermocouple extending between the two areas wherein it is soldered into said axial channel so as to be freely movable relative to the axial channel to allow for a difference in thermal expansion between the thermocouple element and said first fitting member.

2. A thermocouple assembly as claimed in claim 1, said second fitting member having an externally threaded portion along part of its axial length, and an axial bore in which there extends said thermocouple.

3. A thermocouple assembly as claimed in claim 1, said thermocouple being a relatively thin, substantially cylindrical shaped thermocouple.

4. A thermocouple assembly as claimed in claim 1, said axial channel being formed along the outer surface of said first protective fitting member.

5. A thermocouple assembly as claimed in claim 1, said axial channel being a bore extending axially interiorly of said first fitting member.

6. A thermocouple assembly as claimed in claim 1, comprising two of said thermocouples; and two of said axial channels being formed in said first protective fitting member and extending axially thereof, each said axial channel being adapted to receive respectively one of said thermocouples.

* * * * *